Dec. 24, 1946.  I. L. ROBBLEE  2,413,193

EYE SHIELD OR SHADE

Filed Sept. 25, 1944

INVENTOR
IDE L. ROBBLEE
BY Louis L. Gagnon
ATTORNEY

Patented Dec. 24, 1946

2,413,193

UNITED STATES PATENT OFFICE 2,413,193

EYESHIELD OR SHADE

Ide L. Robblee, Southbridge, Mass., assignor to American Optical Company, Southbridge, Mass., a voluntary association of Massachusetts Application September 25, 1944, Serial No. 555,607

3 Claims. (Cl. 2—13)

This invention relates to improvements in eye shields or shades of the type for use with an ophthalmic mounting and relates more particularly to a novel method of attachment of said shields with said mounting.

One of the principal objects of the invention is to provide an extremely simple and efficient eye shade or shield for the respective lenses of an ophthalmic mounting and novel method of attachment thereof to the lens supporting rims or lenses of said ophthalmic mounting.

Another object is to provide an eye shade or shield adapted particularly for use with lenses of odd shape contour whereby the said shield may be quickly and easily assembled with the lens supporting means or lens and locked in position by a slight rotary movement.

Another object is to provide an eye shade or shield of the above character shaped substantially to the curvature and contour of the lens with which said shield is to be used.

Another object is to provide a shield of the above character with integral clip portions so located about the contour of the shield as to function cooperatively with the lens supporting structure for establishing the proper relation of the shield with the lens when in binding relation with the lens supporting means.

Other objects and advantages of the invention will become apparent from the following description taken in connection with the accompanying drawing and it will be apparent that many changes may be made in the details of construction and arrangement of parts without departing from the invention as expressed in the accompanying claims. I, therefore, do not wish to be limited to the exact details of construction and arrangement of parts as the preferred form only has been given by way of illustration.

Referring to the drawing.

The idea of providing detachable eye shields or shades for an ophthalmic mounting is not new in the art. There have been several different arrangements developed in the past some of which were quite complex and others relatively simple. Difficulty, however, has been encountered in obtaining an exceptionally simple and inexpensive shield or eye shade which may be quickly and easily assembled with an ophthalmic mounting, which may be reduced to a compact state for ease of conveyance and which will positively retain its relation with the lenses during use.

The present invention, therefore, is directed particularly to overcoming all of the above difficulties and is directed more particularly to ease of assembly and to insuring proper positional relation of the parts and of retaining said relation during the use of the device whereby the eye shade or shield will tend to more positively retain its shape and insure long and efficient use.

Figure 1:
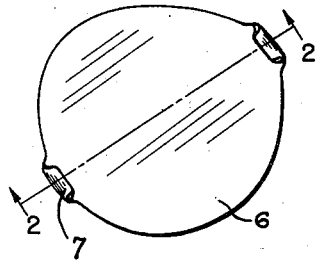
Fig. 1 is a front elevational view of the eye shade or shield embodying the invention.
Figure 2:
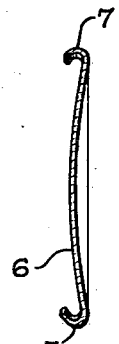
Fig. 2 is a sectional view taken as on line 2—2 of Fig. 1 and looking in the direction of the arrows.
Figure 3:
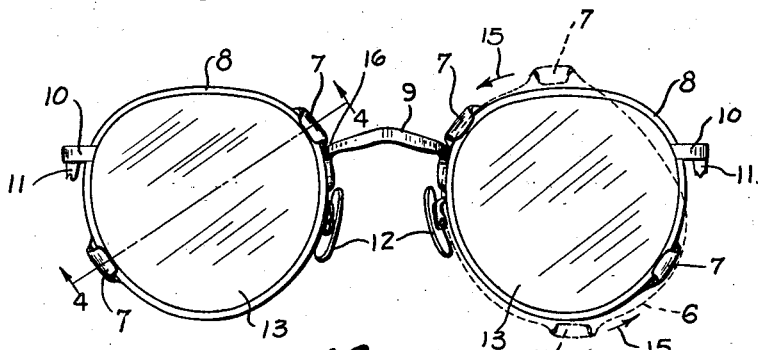
Fig. 3 is a front elevational view of an ophthalmic mounting showing the eye shade or eye shield attached to the lens supporting rims and diagrammatically illustrating in dash lines how the shield is secured in place.

Referring more particularly to the drawing wherein like characters of reference designate like parts throughout the several views, the device embodying the invention comprises a main shade or shield portion 6 having integral clips or hook portions 7 thereon. The said device is adapted for use with an ophthalmic mounting such as shown in Fig. 3. Said ophthalmic mounting is of the conventional type comprising a pair of lens rims 8 joined by a bridge member 9 and having end pieces 10 supporting suitable temples 11 for retaining the mounting on the face, the said mounting being provided with suitable nose bearing pads 12 for engaging the nose when in position of use. The lens rims 8 are adapted to support suitable lenses 13 embodying the prescriptive requirements of the individual. The main shield portion 6 is preferably cupped as illustrated in Figs. 2 and 3 substantially to the curvature of the inner surface 14 of the lens and is provided with a contour shape simulating the contour shape of the lens rims 8 and lenses 13.

As illustrated diagrammatically in Fig. 3 the shield or shade portion 6 is assembled with the lens rims and lenses by placing the main shield portion in overlying relation with the inner surface 14 of the lens and is then rotated in the direction indicated by the arrows 15. This causes the clips or hook portions 7 to move into binding relation with the lens rims 8 as shown by the full lines in Fig. 3. The upper clip or hook portion 7 is adapted to engage the bridge member 9 adjacent its point of attachment 16 with the lenses to limit said rotary movement and thereby cause the contour of the shield to coincide with the contour of the rims, it being understood that the clips or hook portions 7 are so located on the shield portion 6 as to cause the contours of the shield and rims to align with each other when in proper relation therewith.

The shade or shield portion 6 and integral clip or hook portions 7 are preferably formed of Celluloid, transparent artificial resinous material or other plastic which is transparent and may be colored to reduce the transmission of visible rays or may have embodied therein other absorptive means such as means for reducing the transmission of ultra-violet or infra red rays as well as means for reducing the transmission of visible rays. The said integral clips or hook portions 7 are of a resilient nature inherent with the material used in forming the said main shield portion 6 and are of sufficient rigidity to retain the shield in proper aligned relation with the lens rims and lenses.

It is to be understood that the said main shield portions may be formed to any desired contour shape simulating the shape of the lenses or lens rims with which they are to be used. It is also to be understood that although an ophthalmic mounting of the type having lens rims is illustrated in the drawings the said mounting may be of a rimless type and the said shield or shade may be attached directly to the lenses.

Due to the fact that the shield is attached by rotation thereof relative to the lenses, danger of breaking the lenses is greatly reduced as compared with shields of the type which are adapted to be snapped on to the lenses by deflection of the clip or hook portion as has been usual in the past. This is one of the outstanding features of the present invention and provides a novel means of assembling the shield with the lenses or lens rims.

Another distinction in the present invention over the prior art is that the clip or hook portions are so located on the main shield portions as to function cooperatively with the bridge in properly locating the said shields in peripheral alignment with the lens rims or lenses.

Figures 4, 5:
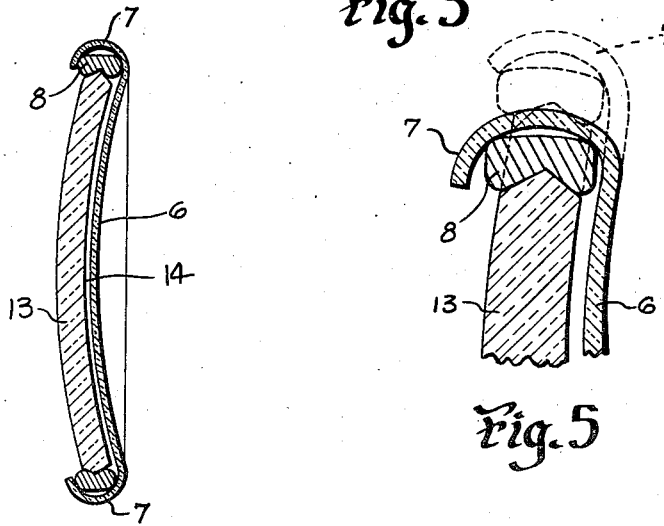
Fig. 4 is a sectional view taken as on line 4—4 of Fig. 3 looking in the direction indicated by the arrows.
Fig. 5 is an enlarged fragmentary sectional view illustrating a modification of the invention.

The said shields are made to varying sizes according to the size of the lens with which they are to be used. The inherent resiliency of the clip or hook portions 7, however, is such, as shown in Fig. 5, that the said clip members will permit the shield 6 to be secured to lenses or lens rims of varying sizes. The outward springing of the clip or hook portions 7 is brought about through a camming action with the lens rims or contour of the lens when the said shield 6 is rotated in the direction indicated by the arrows 15 with the resiliency of the clip or hook portions tending to frictionally bind the shield in attached position. Due to the rotating method of attachment of the shields with the lens rims or lenses, no strain is imparted on said lenses and the said shields may be quickly and easily assembled with the mounting.

When not in use said shields may be placed in a small container for ease of conveyance.

The shields are preferably placed in overlying relation with the surface of the lens and are preferably cupped as illustrated in Figs. 2 and 4 so as to afford clearance of said shields with the eyes so that the said shields will not interfere with the eyelids or eyelashes of the wearer. This cupping of the main shield portion 6 also aids in intimately retaining the shield in fixed relation with the lens rims or lenses.

It is to be noted that the lenses of the ophthalmic mounting are of the type having a greater dimension along the horizontal meridian thereof than along the vertical meridian and that the clip or hook portions 7 are so located on the main shield portion as to lie on the opposed side of the vertical meridian of the shield with one of said hook portions lying between the vertical and horizontal meridians and above the horizontal meridian with the said shields being so dimensioned as to cause the hook portions to move into binding relation with the lenses or lens rims through rotary movement of the said shield relative to the lenses as shown diagrammatically in Fig. 3.

From the foregoing description it will be seen that simple, efficient and economical means have been provided for accomplishing all of the objects and advantages of the invention and that a simple and efficient method of attaching eye shields to the lens rims or lenses is provided whereby danger of breaking the lenses when assembling the shields therewith is greatly reduced particularly with mountings of the rimless type.

Having described my invention, I claim:

1. A pair of detachable eye shades or shields for use with an ophthalmic mounting having a bridge portion for supporting the lenses of the mounting in spaced relation with each other with said lenses having horizontal dimensions greater than their vertical dimensions and of controlled contour shapes, said shades or shields being of similar contour shapes and sizes as the lenses and being cupped substantially to the curvature of the rear surfaces of the lenses and having clip portions so located on the periphery thereof so as to permit the main cupped portions of the shields to be placed in superimposed relation with the rear surfaces of the lenses, with the said clips straddling the vertical dimensions of said lenses and being adapted to grip with the nasal and temporal sides of the lenses through rotation of the shields relative to the lenses and when in proper gripping relation simultaneously cause the contour edges of the lenses and shields to register with each other.

2. A pair of detachable eye shades or shields for use with an ophthalmic mounting having a bridge portion for supporting the lenses of the mounting in spaced relation with each other with said lenses having horizontal dimensions greater than their vertical dimensions and of controlled contour shapes, said shades or shields being of similar contour shapes and sizes as the lenses and being cupped substantially to the curvature of the rear surfaces of the lenses and having clip portions so located on the periphery thereof so as to permit the main cupped portions of the shields to be placed in superimposed relation with the rear surfaces of the lenses, with the said clips straddling the vertical dimensions of said lenses and being adapted to grip with the nasal and temporal sides of the lenses through rotation of the shields relative to the lenses and when in proper gripping relation simultaneously cause the contour edges of the lenses and shields to register with each other and with the upper clip portions being adapted to engage the bridge with said bridge functioning as stop means for limiting the rotary movement of the shields.

3. A pair of detachable eye shades or shields for use with an ophthalmic mounting having a bridge portion for supporting the lenses of the mounting in spaced relation with each other with said lenses having horizontal dimensions greater than their vertical dimensions and of controlled contour shapes, said shades or shields being of similar contour shapes and sizes as the lenses and being cupped substantially to the curvature of one of the side surfaces of the lenses and having clip portions so located on the periphery thereof so as to permit the main cupped portions of the shields to be placed in superimposed relation with a side surface of the lenses, with the said clips straddling the vertical dimensions of said lenses and being adapted to grip with the nasal and temporal sides of the lenses through rotation of the shields relative to the lenses and when in proper gripping relation simultaneously cause the contour edges of the lenses and shields to register with each other.

IDE L. ROBBLEE.